United States Patent
Huonker et al.

(10) Patent No.: US 6,804,274 B2
(45) Date of Patent: Oct. 12, 2004

(54) LASER AMPLIFYING SYSTEM

(75) Inventors: Martin Huonker, Zimmern (DE); Christian Schmitz, Dunningen (DE); Andreas Voss, Schramberg (DE)

(73) Assignee: TRUMPF Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 09/921,002

(22) Filed: Aug. 2, 2001

(65) Prior Publication Data

US 2002/0031162 A1 Mar. 14, 2002

(30) Foreign Application Priority Data

Aug. 4, 2000 (DE) .......................................... 100 38 006

(51) Int. Cl.$^7$ ................................................ H01S 3/04
(52) U.S. Cl. ............................. 372/34; 372/35; 372/43
(58) Field of Search ............................... 372/34, 35, 43

(56) References Cited

U.S. PATENT DOCUMENTS

| | | | | |
|---|---|---|---|---|
| 5,373,627 A | * | 12/1994 | Grebe ........................... | 29/841 |
| 5,663,979 A | * | 9/1997 | Marshall ...................... | 372/103 |
| 5,665,473 A | * | 9/1997 | Okoshi et al. ............... | 428/457 |
| 5,683,942 A | * | 11/1997 | Kata et al. ................... | 438/118 |
| 5,729,561 A | * | 3/1998 | Hironaka ...................... | 372/36 |
| 5,766,277 A | * | 6/1998 | DeVoe et al. ................. | 51/295 |
| 5,844,309 A | * | 12/1998 | Takigawa et al. ............ | 257/701 |
| 5,910,522 A | | 6/1999 | Schmidt et al. | |
| 5,949,805 A | * | 9/1999 | Mordaunt et al. ............. | 372/34 |
| 6,195,372 B1 | * | 2/2001 | Brown .......................... | 372/34 |
| 6,393,038 B1 | * | 5/2002 | Raymond et al. ............. | 372/22 |

FOREIGN PATENT DOCUMENTS

| | | |
|---|---|---|
| DE | 195 12 427 | 10/1996 |
| EP | 0 632 551 | 1/1995 |
| EP | 0 903 819 | 3/1999 |

OTHER PUBLICATIONS

Nabors, C.D., et al., "High–power, continuous–wave, ND:YAG microchip laser array," *Optics Letters*, vol. 17, No. 22, Nov. 15, 1992, pp. 1587–1589.

* cited by examiner

*Primary Examiner*—Don Wong
*Assistant Examiner*—Delma R. Flores Ruiz
(74) *Attorney, Agent, or Firm*—Barry R. Lipsitz; Douglas M. McAllister (57) ABSTRACT

In order to improve a laser amplifying system comprising a plate-like solid-state body which has two oppositely located flat sides and comprises a laser-active medium, a cooling member with a support surface which is arranged so as to face one of the flat sides of the solid-state body and with which this flat side is thermally coupled for the discharge of heat, in such a manner that an optimum coupling takes place it is suggested that the flat side of the solid-state body be coupled mechanically and thermally to the support surface by an adhesive layer which is produced from an adhesive which passes from a liquid state into a solid, cross-linked state essentially invariant in volume and that the adhesive layer have an active adhesive layer area with a heat resistance of less than 10 K×mm$^2$/W.

28 Claims, 6 Drawing Sheets

LASER AMPLIFYING SYSTEM

This application claims the benefit of German Patent Application No. 100 38 006.9 filed on Aug. 4, 2000.

The invention relates to a laser amplifying system comprising a plate-like solid-state body which has two oppositely located flat sides and comprises a laser-active medium, a cooling member with a support surface which is arranged so as to face one of the flat sides of the solid-state body and with which this flat side is thermally coupled for the discharge of heat.

A laser amplifying system of this type is known, for example, from EP 0 632 551.

In the case of such a laser amplifying system, it has not been specified exactly how the solid-state body is intended to be connected to the cooling member.

In particular, it is essential for the connection between solid-state body and cooling member that the solid-state body which is, mechanically, very unstable on account of its slight thickness retains the desired shape and even when retaining its shape is subjected to as little mechanical stressing as possible during the operation of the laser amplifying system.

This object is accomplished in accordance with the invention, in a laser amplifying system of the type described at the outset, in that the flat side of the solid-state body is coupled mechanically and thermally to a support surface by an adhesive layer which is produced from an adhesive material which passes essentially invariant in volume from a liquid state into a solid, cross-linked state and that the adhesive layer has an active adhesive layer area with a heat resistance of less than 10 K×mm$^2$/W.

With this solution it is possible to fix the solid-state body, which is, mechanically, extremely sensitive, on the cooling member securely and without any appreciable mechanical deformations and, in this respect, to bring about a discharge of heat from the solid-state body which ensures an adequate cooling of the solid-state body via the cooling member without any restriction of the flow of heat from the solid-state body into the cooling member occurring as a result of the adhesive layer.

In this respect, the term "essentially invariant in volume" is to understood such that the adhesive displays a change in volume of less than 5%, even better less than 2% whilst passing from its liquid state into its solid, cross-linked state.

A particularly expedient embodiment of the inventive laser amplifying system provides for the heat resistance of the active adhesive layer area to be less than 5 K×mm$^2$/W, even better 2 K×mm$^2$/W.

With respect to the extension of the active adhesive layer area relative to the entire adhesive layer, no further details have so far been given. In principle, the active adhesive layer area could comprise the entire adhesive layer. The active adhesive layer area does, however, preferably comprise only a section of the adhesive layer.

In this respect, it is particularly favorable when the active adhesive layer area is at least that area of the adhesive layer which borders on a volume area of the solid-state body, in which a pumping power density of the pumping light radiation field of approximately 80% of the maximum value and more is present.

This means that the active adhesive layer area preferably serves to discharge the heat from the volume area of the solid-state body which is pumped to a considerable degree, namely the area of the solid-state body pumped with 80% of the pumping power density and more.

It is even more advantageous when the adhesive layer area is at least that area of the adhesive layer which borders on a volume area of the solid-state body, in which a pumping power density of the pumping light radiation field of approximately 70%, even between approximately 60% of the maximum value and more is present.

In addition, there is a further possibility of defining the active adhesive layer area in that the active adhesive layer area is at least that area of the adhesive layer which borders on the volume area of the solid-state body penetrated by the pumping light radiation field.

This definition covers, in particular, all the cases where the pumping light radiation field is coupled into the solid-state body via one of its flat sides.

A further, advantageous solution provides for the active adhesive layer area to be at least that area of the adhesive layer which borders on the volume area of the solid body penetrated by at least two intersecting pumping light radiation fields.

This definition of the volume area covers, on the one hand, all the cases where several pumping light radiation fields are coupled in through one flat side of the solid-state body but also the case where several pumping light radiation fields are coupled in via a narrow side of the solid-state body and intersect in a central area of the solid-state body, wherein the volume area is defined by the intersecting pumping light radiation fields.

In order to bring about, in addition, a sufficiently stable fixing of the solid-state body on the cooling member during operation of the laser amplifying system, it is preferably provided for the adhesive layer to have a tensile strength of more than 1 N/mm$^2$.

In this respect, it is even better when the adhesive layer has a tensile strength of more than 5 N/mm$^2$.

In addition, an adequately high shearing strength of the adhesive layer is also necessary within the scope of the invention solution. It is particularly favorable when the adhesive layer has a shearing strength of more than 5 N/mm$^2$. It is even better when the adhesive layer has a shearing strength of more than 25 N/mm$^2$.

Since, during operation of the laser amplifying system, the solid-state body is optically excited by a pumping light radiation field and thus also heated up thermally, a thermal heating up of the adhesive layer is also to be taken into account.

This thermal heating up of the adhesive layer leads in the case of many adhesives to a variation in shape brought about thermally.

Since the constant optical quality of the arrangement and shape of the solid-state body is of considerable importance for the inventive solution it is particularly advantageous within the scope of the inventive solution when the adhesive layer is essentially thermally invariant in shape in the solid, cross-linked state.

In this respect, the term "essentially thermally invariant in shape" is to be understood such that the adhesive layer displays at the most a maximum admissible change in shape of the solid-state body of 0.5 μm, even better 0.1 μm, in the temperature range of approximately 270 to approximately 360 Kelvin relevant for the inventive laser amplifying system.

With respect to the type of adhesive, no further details have so far been given. One advantageous embodiment, for example, provides for the adhesive to be a two-component adhesive since this is particularly suitable for fulfilling the requirements specified above.

An essentially volume-invariant behavior in accordance with the invention can, in particular, be achieved in a particularly simple manner when the adhesive passes from the liquid state into the solid, cross-linked state without any transfer of substances.

The term "without any transfer of substances" is to be understood in this respect such that no exchange of substances whatsoever with the surroundings takes place, i.e. neither the absorption of substances, e.g. water vapor, nor the discharge of substances, e.g. solvents, or products of reaction, such as, for example, acetic acid, takes place during the hardening.

A particularly favorable variation provides for the adhesive to be an adhesive hardening by way of a supply of energy by means of radiation.

Such a supply of energy by means of radiation would, for example, also be the supply of energy by means of particle radiation or electromagnetic radiation.

In this respect it is particularly favorable when the adhesive is hardened by way of radiation with light.

A particularly preferred variation provides for the adhesive to be hardened by way of radiation with UV light.

Within the scope of the inventive solution described thus far, it has merely been explained in conjunction with the adhesive layer that this contains adhesive.

The viscosity of the adhesive in the non-cross-linked state has not so far been specified. In order to achieve particularly thin adhesive layers it is preferably provided for the adhesive to have a viscosity of less than 1000 mPa×s in the non-cross-linked state.

It is, however, also possible to alter the characteristics of the adhesive by adding filler materials to it.

In this respect, one particularly advantageous embodiment provides for the adhesive layer to be free from filler material since the use of an adhesive without any filler material allows, on the one hand, the viscosity of the adhesive to be kept as low as possible and, on the other hand, as a result the thickness of the adhesive layer can be kept particularly slight when no filler materials are present.

Another advantageous embodiment provides, however, for the adhesive layer to have a filler-material; such a filler material has the advantage that it creates the possibility of improving the heat resistance of the adhesive layer but, at least in some cases, at the expense of the minimum thickness of the adhesive layer which can be achieved and at the expense of the viscosity.

Another filler material could, for example, have nanoparticles which would offer the advantage that they allow a relatively thin adhesive layer.

Another solution provides for the filler material to have filler bodies with a size in the micrometer range.

With respect to the type of filler bodies it is advantageous when the filler material has filler bodies consisting of one or several of the substances boron nitride, diamond, silver, copper and/or gold.

With respect to the thickness of the adhesive layer, no further details have so far been given. Particularly in the case of an adhesive layer free from filler material it is advantageous when the adhesive layer area bordering on the active volume area has a thickness of less than 5 $\mu$m. It is even better when the adhesive layer area bordering on the active volume area has a thickness of less than 2 $\mu$m, even better of less than 1 $\mu$m.

On the other hand, when using filler materials in the adhesive layer it is possible to configure this such that the adhesive layer area bordering on the active volume area has a thickness of less than 50 $\mu$m, wherein the thickness of the adhesive layer area will, in this case as well, preferably be kept as thin as possible so that, for example, in the case of nanoparticles thicknesses of a few micrometers are likewise the aim.

With respect to the design of the optical properties of the adhesive layer, no further details have likewise been given thus far. In principle, the adhesive layer could be as required, for example, also non-transparent. It is, however, particularly favorable when the adhesive layer is optically transparent in order to bring about as slight a negative effect as possible on the optical properties of the solid-state body, in particular, any negative effect due to absorption of the adhesive.

With respect to the design of the adhesive layer itself, no further details have so far been given. One expedient embodiment, for example, provides for the adhesive layer to have an essentially constant thickness. In such a case, the effects on the optical quality of the solid-state body of changes in the volume of the adhesive layer at right angles to the support surface are slight since these occur essentially uniformly over the entire extension of the second flat side.

Another advantageous solution provides for the adhesive layer to have a thickness increasing in a radial direction starting from a center of the active volume area, proceeding from a central adhesive layer area bordering on this center. This solution has the advantage that the solid-state body can be placed on a drop of adhesive in a simple manner and this shape of the adhesive layer may be achieved by pressing on the solid-state body since, as a result, a displacement from the interior outwards and thus a relatively thin design of the adhesive layer may be achieved in a simple manner on account of the shape of the adhesive layer aimed for.

In this respect, it is particularly expedient when the course of the thickness of the adhesive layer is essentially radial symmetric to the center of the active volume area.

Additional features and advantages of the invention are the subject matter of the following description as well as the drawings illustrating several embodiments.

Figure 1:
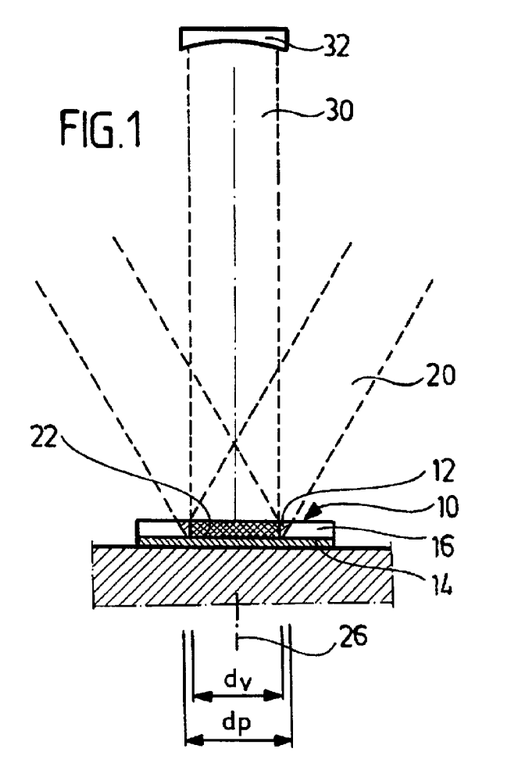
FIG. 1 shows a longitudinal section through a first embodiment of an inventive laser amplifying system.

A first embodiment of a laser amplifying system, illustrated in FIG. 1, comprises a plate-like solid-state body 10 which is provided with a laser-active medium.

The solid-state body 10 preferably consists of one of the host crystals YAG, YVO$_4$, Y$_2$O$_3$, Sc$_2$O$_3$, Lu$_2$O$_3$, KGdWO$_4$, KYWO$_4$, YAP, YALO, GGG, GSGG, GSAG, LSB, GCOB, FAP, SFAP, YLF and is doped, in addition, with Nd$^{3+}$ or Yb$^{3+}$ as laser-active material.

The solid-state body 10 is preferably designed in a disk shape and has a first flat side 12 and a second flat side 14 located opposite, between which a narrow side 16 representing a circumferential side extends.

The solid-state body 10 is, in addition, penetrated by a pumping light radiation field 20 which excites the laser-active medium in the solid-state body 10, wherein the pumping light radiation field 20 can, for example, be coupled into the solid-state body 10 from all sides thereof.

The pumping light radiation field 20 is preferably coupled in, as illustrated in FIG. 1, via the first flat side 12, wherein the pumping light radiation field 20 optically excites the laser-active medium in the solid-state body 10 in a volume area 22.

In order to be able to reflect the pumping light radiation field 20 back and forth several times, the solid-state body 10 is provided on its second flat side 14 with a reflector 24 for the pumping light radiation field 20 so that the pumping light radiation field 20 enters the solid-state body 10 via the first flat side 12 and exits again via the first flat side 12 on account of the reflection at the reflector 24, is preferably reflected back again by means of external optical devices and again enters the solid-state body 10 via the first flat side 12, is reflected at the reflector 24 and again exits via the first flat side 12 and this, where applicable, several times.

As a result of this multiple reflection, a particularly efficient excitation of the laser-active medium in the volume area 22 may be generated.

The volume area 22, within which the laser-active medium in the solid-state body 10 is optically excited by means of the pumping light radiation field 20, has an extension in the direction of the flat sides 12 or 14 which is designated in FIG. 1 with $d_p$, wherein this extension can be of different sizes depending on the type of incidence and the reflection of the pumping light radiation field 20 in different directions. The extension $d_p$ of the volume area 22 is of equal size on all sides only in the case of a rotationally symmetric design of the volume area 22 in relation to a central axis 26 which is at right angles to the flat sides 12 and 14.

In addition, the solid-state body 10 is penetrated by an amplifying radiation field 30 which extends between an external reflector 32 and a reflector 34 which is likewise associated with the second flat side 14.

For example, one advantageous solution provides for the reflectors 24 and 34 to be combined to form a single reflector which is reflecting not only for the pumping light radiation field 20 but also for the amplifying radiation field 30.

It is, however, also conceivable to provide two different reflector layers on the second flat side 14, for example, one reflector layer 34 for the amplifying radiation field 30 located directly on the second flat side 14 and one reflector layer 24 for the pumping light radiation field 20 located on the reflector layer 34.

In the embodiment illustrated, the amplifying radiation field 30 is guided such that it propagates symmetrically to the central axis 26. In this respect, a volume area 36 of the solid-state body 10 is penetrated by the amplifying radiation field 30 which may be smaller but also larger than the volume area 22 which is penetrated by the pumping light radiation field 20.

The volume area 36 thereby has an extension in the direction of the flat side 12 or 14 which is designated as $d_v$, and is likewise of equal size in the direction of the flat sides 12 and 14 in the case of a rotationally symmetric design of the amplifying radiation field 30 in relation to the central axis 26 but can be of different sizes in other cases.

The solid-state body 10 is arranged for the purpose of cooling on a cooling member which is designated as a whole as 40 and has a support surface 42 which faces the second flat side 14.

An adhesive layer designated as a whole as 44 is applied to the support surface 42 and this layer supports the solid-state body 10, wherein the solid-state body 10 faces the support surface 42 with the second flat side 14 and rests on the adhesive layer 44, for example, with the reflectors 24 and 34 connected to the second flat side 14 so that heat is conducted from the second flat side 14, in a direction transverse thereto, to the support surface 42 preferably over the entire extension of the second flat side 14 transversely to the central axis 26, wherein at the same time the reflectors 24 and 34 likewise conduct the heat areally from the second flat side 14 into the adhesive layer 44 which then conducts the heat into the cooling member 40 via the support surface 42.

Since an appreciable heating up in the solid-state body 10 occurs primarily in the part 23 of the volume area 22 penetrated by the part of the pumping light radiation field 20 with the greatest pumping power density, the heat generated in the volume area 22 by the pumping light radiation field 20 is essentially discharged to the cooling member 40 preferably via an active adhesive layer area 46 bordering on this part 23 of the volume area 22.

The active adhesive layer area 46 is preferably to be selected such that it covers the entire part 23 of the volume area 22 penetrated by the pumping light radiation field 30 but preferably the greater volume area 22 penetrated by the pumping light radiation field 20, as well.

Figure 2:
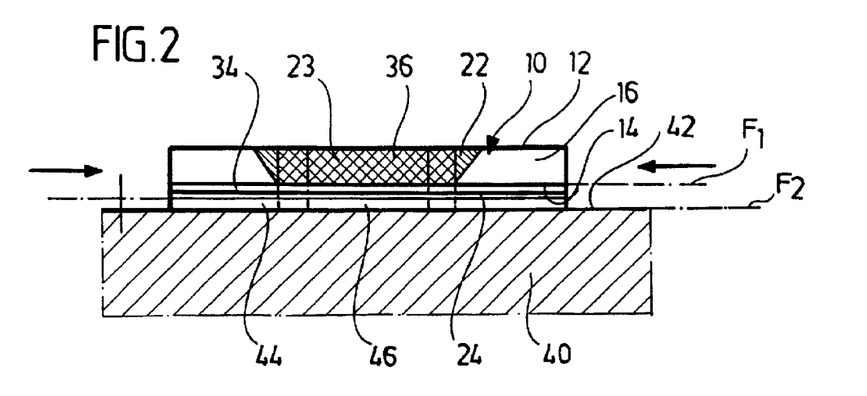
FIG. 2 shows an enlarged section similar to FIG. 1 of a detail in the area of a solid-state body and cooling member.

In the embodiment illustrated in FIGS. 1 and 2, the second flat side 14 extends in a surface F1 which represents a plane and, in addition, the support surface 42 also extends in a surface F2 which likewise represents a plane so that the adhesive layer 44 has a thickness D which is essentially constant over the entire extension of the second flat side 14.

In this case, with an unfilled adhesive, it is preferably provided for the heat resistance of the adhesive layer 44 at right angles to the support surface 42 to be less than 5 K×mm$^2$/W. It is even better when the heat resistance of the adhesive layer 44 is less than 2 K×mm$^2$/W. For example such an adhesive layer can be obtained with the adhesive "Norland Optical Adhesive 61" of the company Norland Products.

Since the adhesive layer 44 is essentially of the same thickness over its entire extension in the direction of the second flat side 14, the thickness D and, with it, automatically the heat resistance of the adhesive layer area 46, which extends in the direction of the second flat side 14 at least over the extension of the volume area 36 penetrated by the amplifying radiation field 30 but preferably also extends over the extension of the volume area 22 penetrated by the pumping light radiation field 20, is selected accordingly.

Figure 3:
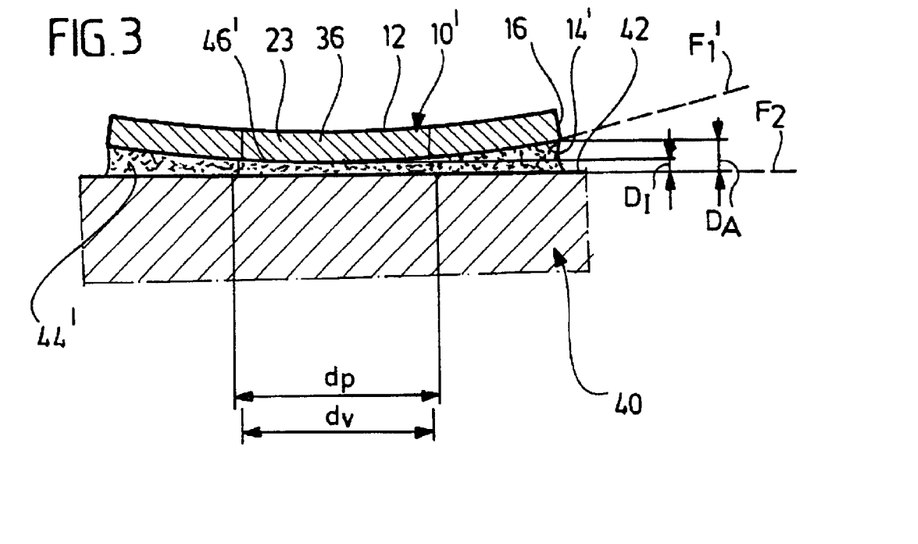
FIG. 3 shows a section similar to FIG. 2 of a second embodiment.

In a second embodiment of an inventive laser amplifying system, illustrated in FIG. 3, the solid-state body 10' is designed such that its second flat side 14' has a curvature and is thus located in a surface F1' which represents, for example, a section from a spherical surface.

Furthermore, the support surface 42 which extends in the surface F2 is designed as a flat surface so that, altogether, an adhesive layer 44' results which has in the adhesive layer area 46' a thickness $D_f$ which is preferably smaller than 2 µm, even better smaller than 1 µm, in the case of an unfilled adhesive whereas the thickness D of the adhesive layer 44' increases in a radial direction proceeding from the central axis 26 and has, for example, in the area of the narrow side 16 a thickness $D_A$ which is greater than the thickness $D_f$, for example, is double the thickness $D_f$ or more, whereby the thickness $D_A$ is also dependent on the extent, to which the solid-state body 10' extends beyond the volume area 36 penetrated by the amplifying radiation field 30.

Figure 4:
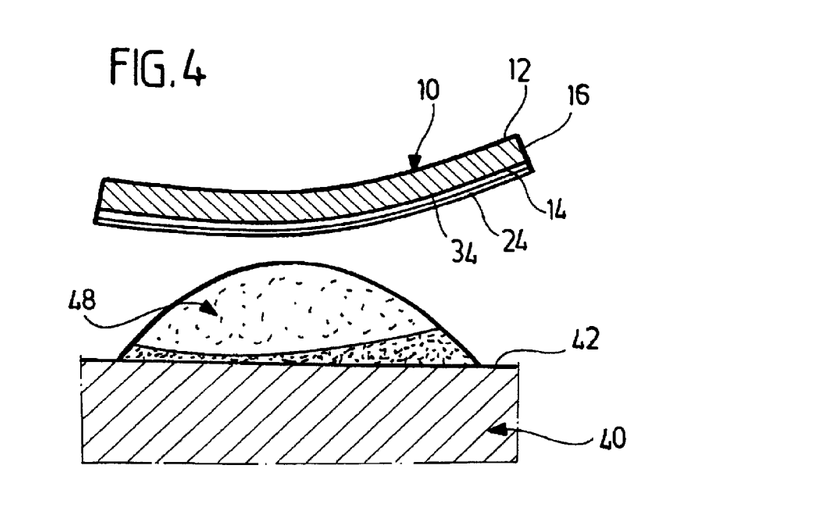
FIG. 4 shows a section similar to FIG. 2 of the second embodiment prior to the solid-state body being placed on the cooling member.
Figure 5:
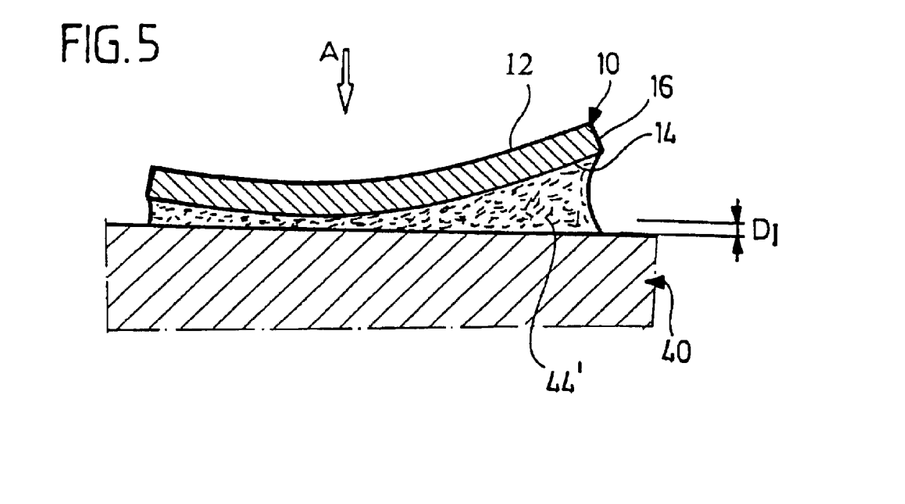
FIG. 5 shows a section similar to FIG. 4 after the solid-state body has been placed on a drop of adhesive on the cooling member.

The advantage of an adhesive layer 44' with a variable thickness D, in particular, a thickness D increasing continuously from the central axis 26 in a radial direction, is to be seen in the fact that it is possible to adhere the solid-state body 10 to the cooling member 40 in an advantageous manner, namely due to the fact that a drop 48 of adhesive is applied to the support surface 42 and, subsequently, the solid-state body 10 is placed on the drop 48 with its second flat side 14 and the reflector layers 24 and 34 which are present where applicable, wherein the adhesive of the drop 48 may be pressed radially outwards in a simple manner in order to obtain as thin an adhesive layer 44 as possible, as illustrated in FIG. 5.

Figure 6:
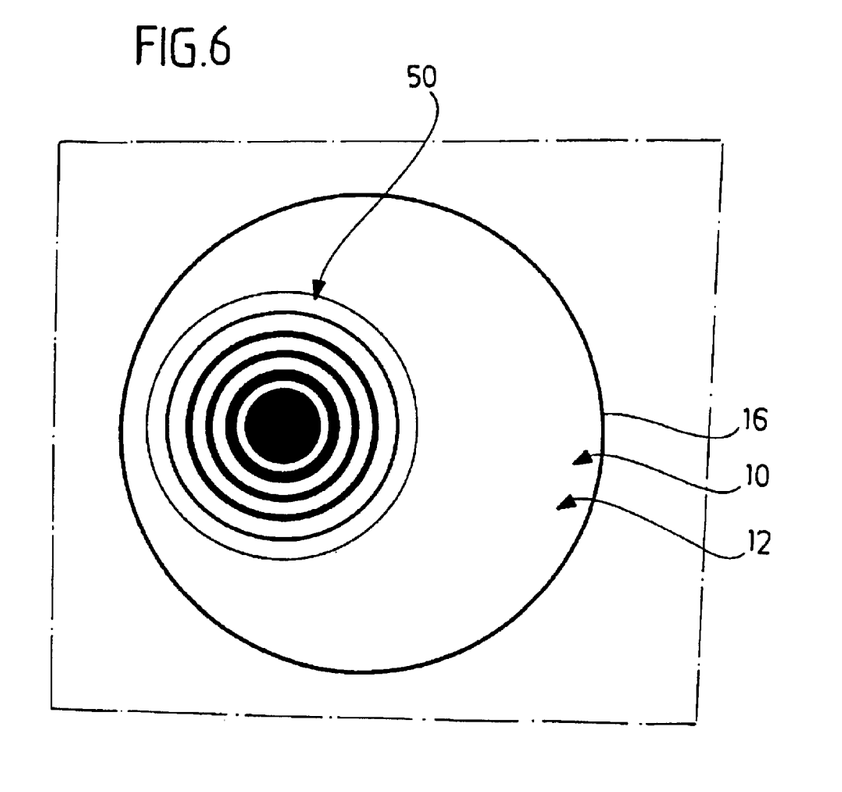
FIG. 6 shows a plan view in the direction of arrow A in FIG. 5 with illustration of the Newton's rings resulting on account of the varying thickness of the adhesive layer.

In this respect, it is possible to recognize the thinnest point of the adhesive layer 44 with the thickness $D_f$, as illustrated in FIG. 6, by way of so-called Newton's rings 50.

Figure 7:
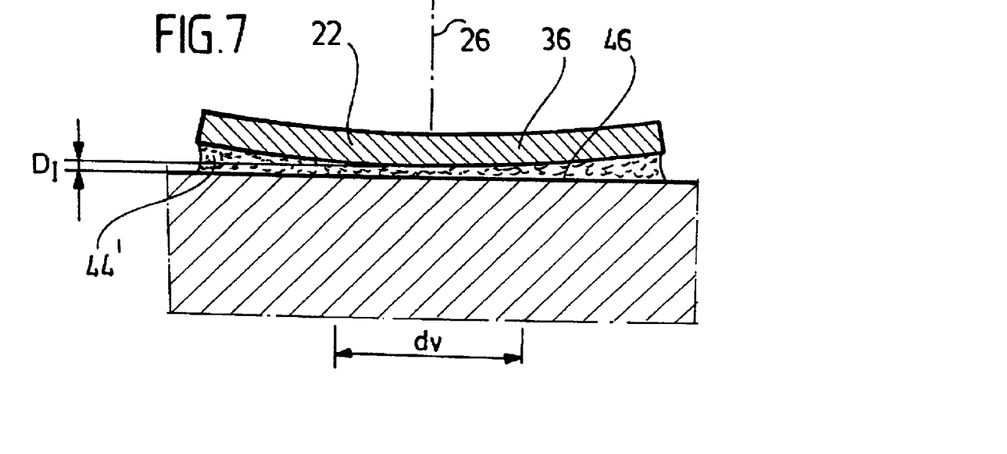
FIG. 7 shows a section similar to FIG. 5 with an essentially symmetrical design of the adhesive layer.
Figure 8:
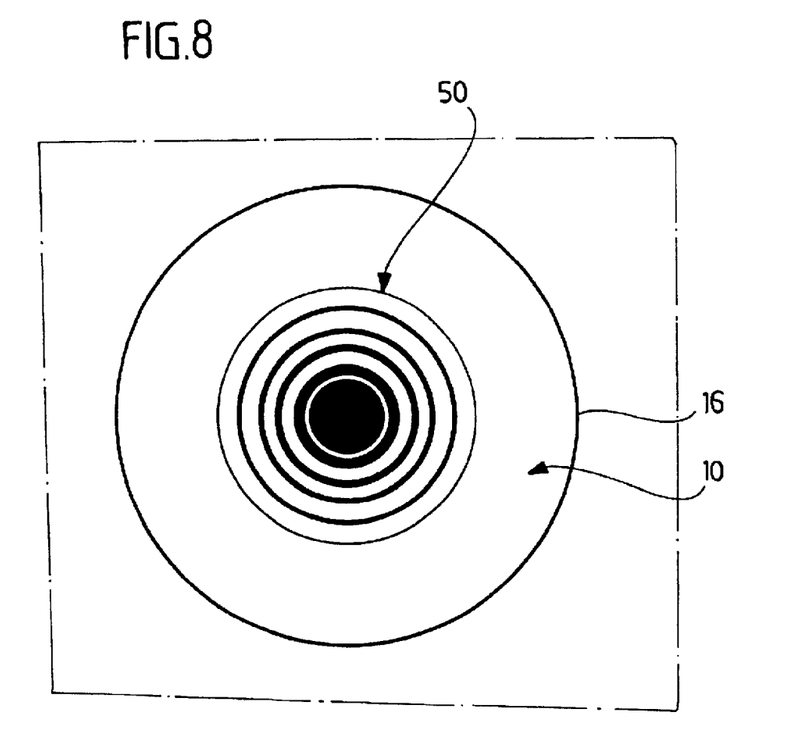
FIG. 8 shows an illustration similar to FIG. 6 in the case of the relationships according to FIG. 7.

Furthermore, it is possible to recognize the position of the area with the slightest thickness D due to the position of the Newton's rings 50 relative to the outer edge of the solid-state body 10 predetermined by the narrow side 16 and to place the solid-state body 10 on the cooling member 40 such that, as illustrated in FIGS. 7 and 8, the Newton's rings 50 are located approximately centrally in relation to the outer edge of the solid-state body 10 predetermined by the narrow side 16 and, consequently, the active adhesive layer area 46, which is preferably arranged symmetrically to the central axis 26, is also that area of the adhesive layer 44' which has the slightest thickness $D_f$ and borders directly on the volume area 36 which is penetrated by the amplifying radiation field 30 or even better also borders on the volume area 22 which is penetrated by the pumping light radiation field 20.

In this respect, the adhesive is preferably an adhesive which hardens due to a supply of energy on account of radiation with, for example, UV light, wherein the radiation with UV light takes place through the solid-state body 10, i.e. UV light which enters the solid-state body 10 via the first flat side 12 and passes through the solid-state body 10, exits from the second flat side and also passes through the reflectors 24 and 34. This is possible since the wavelength of the pumping light radiation field 20 and of the amplifying radiation field 30 is respectively located in the infrared range and so the reflectors 24 and 34 can be selected to be permeable for UV light.

It is, however, also conceivable to radiate the adhesive layer 44' through the cooling member 40 when this consists of a material permeable for the corresponding light, for example, consists of a CVD diamond.

As a result, it is possible in a simple manner, on the one hand, as illustrated in FIGS. 7 and 8, to control and set the correct alignment of the solid-state body 10 relative to the cooling member 40 via the Newton's rings and then, in this setting of the solid-state body 10 relative to the cooling member 40, to harden the adhesive to form the adhesive layer 44'.

In this respect, it is particularly advantageous within the scope of the inventive solution when the adhesive hardens without any transfer of substances with the surroundings, i.e. any transfer of water vapor, solvent or volatile chemicals, such as, for example, acetic acid, since the hardening process then takes place essentially invariant in volume, i.e. with a change in volume of less than 5%, even better less than 2%, and the alignment of the solid-state body 10 once achieved relative to the cooling member 40 is essentially retained during the hardening process and so, in particular, no stresses act on the solid-state body 10 in a direction parallel to the second flat side 14 In the case of a hardened adhesive and thus the solid-state body 10 is prevented from becoming unusable on account of the stresses acting in a direction parallel to the second flat side 14.

The adhesive for forming the adhesive layer 44' is thereby selected such that it has a viscosity of less than 1000 mPa×s in the non-cross-linked state and so the solid-state body can be placed on the drop 48, as illustrated in FIGS. 4 and 5, such that the adhesive can flow for achieving as thin an adhesive layer as possible and for aligning the solid-state body 10 relative to the cooling member 40 with little force acting on the solid-state body 10.

Furthermore, it is preferably provided for the hardened adhesive in the adhesive layer 44' to have a tensile strength of more than 5 N/mm².

Moreover, a shearing strength of the adhesive layer 44' of more than 5 N/mm² is preferred. It is even better when the adhesive layer has a shearing strength of more than 25 N/mm².

All the comments concerning properties of the adhesive and the adhesive layer 44' also apply in the same way for the adhesive and the adhesive layer 44 which have been described in the first embodiment.

Furthermore, it is particularly advantageous when the adhesive is selected such that this is thermally essentially invariant in shape in the cross-linked state during formation of the adhesive layer 44', i.e. any heating up of the adhesive layer 44' leads to a change in volume and shape of less than 2% so that the heating up of the adhesive layer 44' during the course of the discharge of heat from the solid-state body 10 during the excitation of the laser-active medium by means of the pumping light radiation field 20 also does not lead to any change in the shape of the adhesive layer 44' and thus to any change in the shape of the solid-state body 10.

This is particularly essential when the adhesive layer 44', as, for example, in the second embodiment, has a variable thickness D since in the case of any thermal instability of the shape of the adhesive layer 44', a change in the curvature of the surface F1', in which the second flat side 14 extends, would occur during the heating up of the adhesive layer since it is to be assumed that the support surface 42 of the cooling member 40 will not alter and thus the surface $F_2$ retain its flat shape when the cooling member 40 is produced from customary materials which are good heat conductors, such as, for example, metals or also diamonds.

Figure 9:
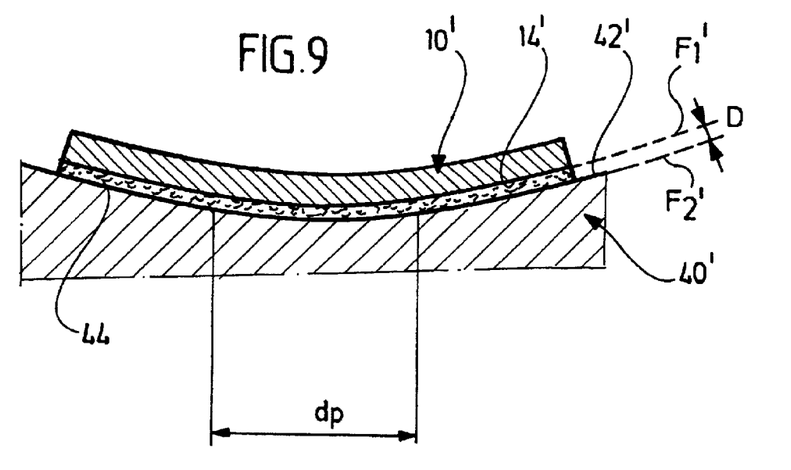
FIG. 9 shows a section similar to FIG. 2 through a third embodiment.

In a third embodiment, illustrated in FIG. 9, not only is the surface F1' curved and thus the second flat side 14' of the solid-state body 10' but also the support surface 42' which is now located in a curved surface F2'.

The radii of curvature of the surfaces F1' and F2' are preferably selected such that they always extend at a constant distance relative to one another. This leads to the adhesive layer 44 having essentially the constant thickness D between the solid-state body 10' and the cooling member 40', similar to the first embodiment, namely over its entire extension in the direction of the second flat side 14, but being, however, curved.

This solution does, however, have the disadvantage that the essentially uniform thickness D of the adhesive layer 44 is only achieved when the thickness D corresponds to the difference in the radii of the surfaces F1' and F2'.

Figure 10:
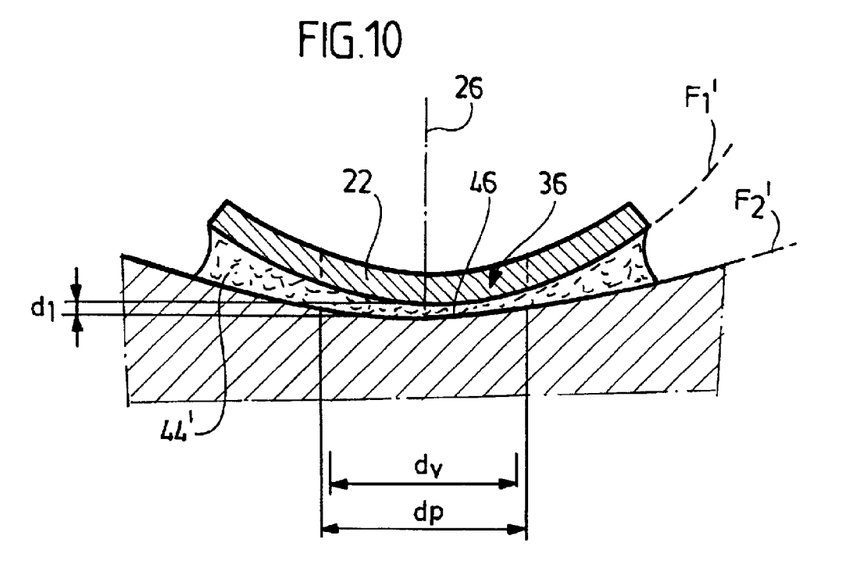
FIG. 10 shows a section similar to FIG. 3 through a fourth embodiment.

In a fourth embodiment, illustrated in FIG. 10, the surfaces F1' and F2' are likewise both curved but with different radii so that the adhesive layer 44' thereby resulting has a variable thickness D, in the same way as in the second embodiment, namely a variable thickness D which increases in size in a radial direction relative to the central axis 26 so that essentially the same conditions can be achieved as in the second embodiment.

With respect to the remaining features, in particular, the configuration of the adhesive layer 44 and 44' in the third and fourth embodiments, reference is made in full to the comments on the second and, where applicable, first embodiments.

Figure 11:
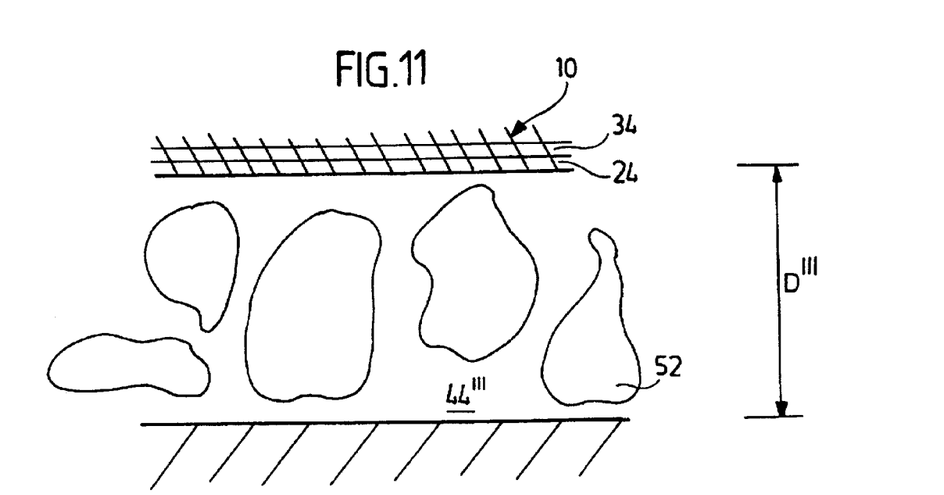
FIG. 11 shows a more enlarged sectional illustration similar to FIG. 2 in a fifth embodiment with an adhesive filled with filler bodies and FIG. 12 shows a plan view of a sixth embodiment.

In a fifth embodiment, illustrated in FIG. 11, it is not an unfilled adhesive which is used but rather the adhesive layer 44''' has filler bodies 52 which are incorporated between the adhesive material and have an extension of more than 2 $\mu$m, preferably up to 30 or 40 $\mu$m, so that the minimum achievable thickness D''' of the adhesive layer 44''' is limited by the approximately double size of the filler bodies 52.

Filler bodies of this type are, for example, boron nitride, diamond, silver or possibly also Cu or Au which all contribute to a good heat conduction but, on the other hand, lead to an increase in the minimum thickness of the adhesive layer 44''' so that an improvement in the heat conductivity of the adhesive layer 44''' in comparison with an adhesive layer of 44 or 44' is very difficult to achieve due to the filler members.

As for the rest, reference is made in full to the preceding embodiments with respect to additional features of the fifth embodiment.

Figure 12:
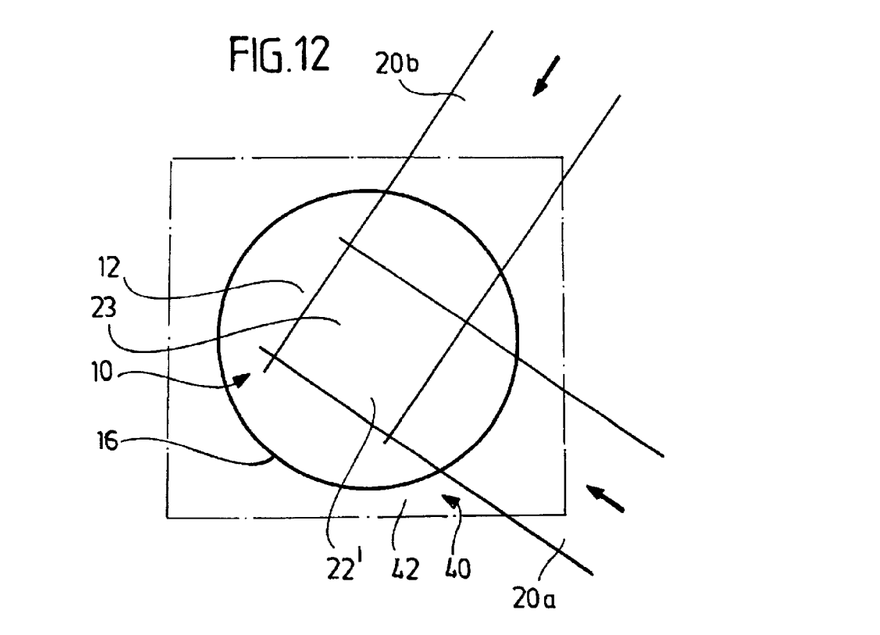

In a sixth embodiment, which corresponds to the first embodiment with respect to the composition of the solid-state body 10 and the cooling member 40, the pumping of the solid-state body 10 is provided, in contrast to the first embodiment, via two pumping light radiation fields 20a and 20b which enter the solid-state body 10 through the narrow side 16 and intersect in a volume area 22' so that in this volume area 22' the pumping power density results as superposition of the pumping light radiation fields 20a and 20b and thus a higher pumping power density is present than outside the volume area 22' (FIG. 12).

As for the rest, reference is made in full to the first embodiment with respect to the additional features of the sixth embodiment.

What is claimed is:

1. A laser amplifying system comprising:
    a plate-like solid-state host crystal doped with a laser active component, said solid state host crystal having two oppositely located flat sides;
    a radiation source for optically pumping said laser active component to generate an amplified radiation field for output from a first one of said flat sides of said solid-state host crystal;
    a cooling member with a support surface for said solid-state host crystal;
    a second one of said flat sides of said solid-state host crystal being mechanically and thermally coupled to said support surface via an adhesive layer that comprises a cross-linked adhesive material;
    said adhesive material being of a type that is essentially invariant in volume when changing from a liquid state into a solid, cross-linked state; and
    the adhesive layer having an active adhesive layer area with a heat resistance of less than 10 K×mm$^2$/W.

2. A laser amplifying system as defined in claim 1, wherein the heat resistance of the active adhesive layer area is less than 5 K×mm$^2$/W.

3. A laser amplifying system as defined in claim 1, wherein the active adhesive layer area is at least that area of the adhesive layer bordering on a volume area of a radiation field of the solid-state body having a pumping power density of at least approximately 80% of the maximum value present in it.

4. A laser amplifying system as defined in claim 1, wherein the active adhesive layer area is at least that area of the adhesive layer bordering on the volume area of the solid-state body penetrated by a pumping light radiation field from the radiation source.

5. A laser amplifying system as defined in claim 1, wherein the active adhesive layer area is at least that area of the adhesive layer bordering on a volume area of the solid-state body penetrated by at least two intersecting pumping light radiation fields.

6. A laser amplifying system as defined in claim 1, wherein the adhesive layer has a tensile strength of more than 1 N/mm$^2$.

7. A laser amplifying system as defined in claim 6, wherein the adhesive layer has a tensile strength of more than 5 N/mm$^2$.

8. A laser amplifying system as defined in claim 1, wherein the adhesive layer has a shearing strength of more than 5 N/mm$^2$.

9. A laser amplifying system as defined in claim 8, wherein the adhesive layer has a shearing strength of more than 25 N/mm$^2$.

10. A laser amplifying system as defined in claim 1, wherein the adhesive layer is essentially thermally invariant in shape in the solid, cross-linked state.

11. A laser amplifying system as defined in claim 1, wherein the adhesive is a two-component adhesive.

12. A laser amplifying system as defined in claim 1, wherein the adhesive passes from the liquid state into the solid, cross-linked state without any transfer of substances.

13. A laser amplifying system as defined in claim 1, wherein the adhesive is adapted to harden when exposed to radiation.

14. A laser amplifying system as defined in claim 13, wherein the adhesive is hardened by way of radiation with light.

15. A laser amplifying system as defined in claim 14, wherein the adhesive is hardened by way of radiation with UV light.

16. A laser amplifying system as defined in claim 1, wherein the adhesive has a viscosity of less than 1000 mPa×s in the non-cross-linked state.

17. A laser amplifying system as defined in claim 1, wherein the adhesive layer is free from filler material.

18. A laser amplifying system as defined in claim 1, wherein the adhesive layer has a filler material.

19. A laser amplifying system as defined in claim 18, wherein the filler material has nanoparticles.

20. A laser amplifying system as defined in claim 18, wherein the filler material has filler bodies with a size in the micrometer range.

21. A laser amplifying system as defined in claim 20, wherein the filler material has filler bodies consisting of one or more of the substances boron nitride, diamond, silver, copper and/or gold.

22. A laser amplifying system as defined in claim 1, wherein the adhesive layer area bordering on the active volume area has a thickness of less than 5 $\mu$m.

23. A laser amplifying system as defined in claim 22, wherein a portion of the adhesive layer bordering on an active volume area has a thickness of less than 2 $\mu$m.

24. A laser amplifying system as defined in claim 18, wherein a portion of the adhesive layer bordering on an active volume area has a thickness of less than 50 μm.

25. A laser amplifying system as defined in claim 1, wherein the adhesive layer is optically transparent.

26. A laser amplifying system as defined in claim 1, wherein the adhesive layer has an essentially constant thickness.

27. A laser amplifying system as defined in claim 1, wherein the adhesive layer has an increasing thickness in a radial direction in relation to a center of an active volume area starting from a central adhesive layer area bordering on said center.

28. A laser amplifying system as defined in claim 1, wherein the course of the thickness of the adhesive layer is essentially radially symmetric to a center of an active volume area.

* * * * *